United States Patent [19]

Powell et al.

[11] Patent Number: 5,382,605
[45] Date of Patent: Jan. 17, 1995

[54] POLYCONDENSATES WHICH CAN BE STERILIZED BY γ-RADIATION

[75] Inventors: Douglas G. Powell, Coraopolis; Charles E. Lundy, Pittsburgh, both of Pa.; Gerhard Fennhoff, Willich, Germany; Ralf Hufen, Duisburg, Germany; Klaus Kircher, Leverkusen, Germany

[73] Assignees: Miles Inc., Pittsburgh, Pa.; Bayer Aktiengesellschaft, Leverkusen, Germany

[21] Appl. No.: 196,323

[22] Filed: Feb. 15, 1994

Related U.S. Application Data

[63] Continuation of Ser. No. 53,927, Apr. 26, 1993, which is a continuation-in-part of Ser. No. 891,875, Jun. 3, 1992, Pat. No. 5,214,078.

[51] Int. Cl.⁶ .................. C08L 69/00; C08L 5/37; C08L 5/36; C08L 5/18
[52] U.S. Cl. .................. 523/136; 524/115; 524/248; 524/257; 524/258; 524/330; 524/333; 524/339; 524/370; 524/377; 524/378; 524/392; 525/409; 525/439; 525/470
[58] Field of Search .............. 523/136; 524/115, 248, 524/257, 330, 332, 333, 339, 377, 378, 392, 396, 258, 370; 525/409, 439, 470

[56] References Cited

U.S. PATENT DOCUMENTS

| | | | |
|---|---|---|---|
| 3,909,490 | 9/1975 | Mark | 524/159 |
| 4,067,846 | 1/1978 | Mark | 260/45.9 X |
| 4,123,474 | 10/1978 | Katchman | 524/258 |
| 4,451,641 | 5/1984 | Sublett et al. | 528/295.5 |
| 4,469,850 | 9/1984 | Belfoure et al. | 525/439 |
| 4,624,972 | 11/1986 | Nace | 523/136 |
| 4,751,283 | 6/1988 | Rosenquist et al. | 528/370 |
| 4,804,692 | 2/1989 | Lundy et al. | 523/137 |
| 4,873,271 | 10/1989 | Lundy | 523/136 |
| 4,874,802 | 10/1989 | Lundy et al. | 524/94 |
| 4,880,855 | 11/1989 | Nelson | 523/136 |
| 4,880,856 | 11/1989 | Avakian | 123/136 |
| 4,904,710 | 2/1990 | Nace | 523/137 |
| 4,939,185 | 7/1990 | Nelson et al. | 523/136 |
| 5,212,224 | 5/1993 | Meyer | 524/370 |
| 5,214,078 | 5/1993 | Powell | 523/136 |

FOREIGN PATENT DOCUMENTS

| | | |
|---|---|---|
| 114290 | 8/1984 | European Pat. Off. . |
| 152012 | 8/1985 | European Pat. Off. . |
| 296473 | 12/1988 | European Pat. Off. . |
| 303894 | 2/1989 | European Pat. Off. . |
| 439763 | 8/1991 | European Pat. Off. . |
| 2750064 | 6/1978 | Germany . |
| 4127079 | 7/1991 | Germany . |
| 022088 | 6/1972 | Japan . |
| 138048 | 11/1975 | Japan . |
| 98940 | 4/1989 | Japan . |

*Primary Examiner*—David Buttner
*Attorney, Agent, or Firm*—Joseph C. Gil; Aron Preis

[57] ABSTRACT

A thermoplastic molding composition resistant to the degradation induced by ionizing-radiation is disclosed. The composition contains an aromatic polycondensate and an agent which is a compound conforming structurally to formula (I)

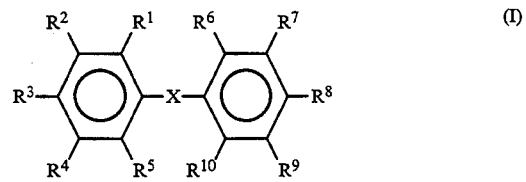

(I)

or which is a member selected from the group consisting of oligocarbonate, polycarbonate, copolycarbonate, polyestercarbonate and polyesters which contain structural units conforming to formula (Ia)

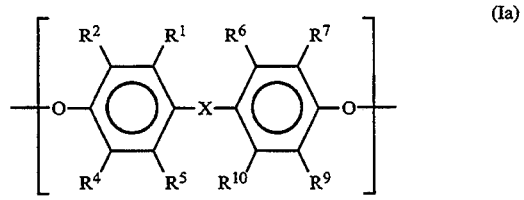

(Ia)

wherein $R^1$ to $R^{10}$ and X are defined. The composition is suitable for the manufacture of shaped articles, especially articles useful in medical applications.

10 Claims, No Drawings

POLYCONDENSATES WHICH CAN BE STERILIZED BY γ-RADIATION

This application is a continuation of application Ser. No. 08/053,927, now abandoned, filed Apr. 26, 1993, which is a Continuation-In-Part of Ser. No. 07/891,875, filed Jun. 3, 1992, now U.S. Pat. No. 5,214,078.

BACKGROUND OF THE INVENTION

The present invention relates to thermoplastically formable aromatic polycondensates such as aromatic polycarbonates and/or aromatic copolycarbonates and/or aromatic polyester carbonates which are stabilized against damage, for example, in the form of yellowing due to exposure to ionizing radiation, such as gamma and/or electron beam radiation, by being mixed with organic compounds, according to the following formula (I)

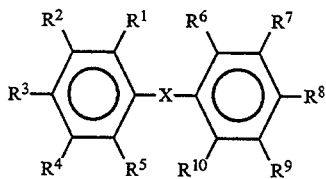

in which $R^1$ to $R^{10}$ are identical or different and represent H, OH, SH, O-alkyl, S-alkyl, O-aryl, S-aryl, COOH, COOalkyl, COOaryl, COalkyl, COaryl, COH, C(Oalkyl)$_2$, C(Ocycloalkyl)$_2$, OCOOalkyl, OCOOaryl, SO$_3$H, SO$_3$alkyl, SO$_3$aryl, SO$_2$H, SO$_2$alkyl, SO$_2$aryl, SOH, SOalkyl, SOaryl, alkyl and aryl, $R^1$ and $R^6$ can be linked by a covalent bond and X represents NH, PH, O, S, S$_2$, CR$^{11}$=CR$^{12}$,

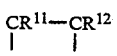

wherein $R^{11}$ and $R^{12}$ can be identical or different and can have the same meaning as $R^1$ to $R^{10}$.

Preferred compounds of the formula (1) are those in which X=S, in particular diphenyl sulphide, and those in which X=S and $R^1$ and $R^6$ are a covalent bond or are linked by a covalent bond, such as, for example, thianthrene.

Particularly preferred compounds of the formula (I) are those in which X=O, R$^{11}$C=CR$^{12}$ or C=CR$^{11}$R$^{12}$.

Most preferred compounds of the formula (I) are those in which X=S$_2$.

The compounds of the formula (I) are employed in quantities of 0.001% by weight to 5% by weight, preferably 0.005% by weight to 1% by weight, and most preferably 0.01% by weight to 0.8% by weight, based on 100% by weight of polycondensate.

The present invention also relates to mixtures of thermoplastically formable aromatic polycondensates, such as aromatic polycarbonates and/or aromatic copolycarbonates and/or aromatic polyester carbonates, with oligocarbonates and/or polycarbonates and/or copolycarbonates and/or polyester carbonates and/or polyesters which themselves act as stabilizers against damage of the polycondensates, e.g. in the form of yellowing due to ionizing radiation, such as, for example, gamma and/or electron beam radiation.

Stabilizing oligocarbonates, polycarbonates, copolycarbonates, polyester carbonates and polyesters of the above-mentioned kind are those contained structural units of the formula (Ia)

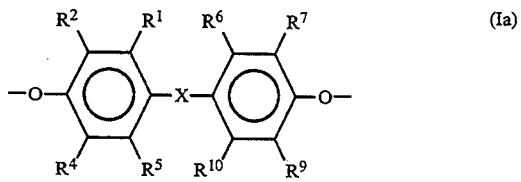

in which substituents $R^1$ to $R^{10}$ have the same meaning as in formula (I).

Particularly preferred compounds are oligocarbonates, polycarbonates, copolycarbonates, polyester carbonates and polyesters containing bisphenolate radicals of the formula (Ia), in which X=O.

Most preferred compounds are oligocarbonates, polycarbonates, copolycarbonates, polyester carbonates and polyesters containing bisphenolate radicals of the formula (Ia), in which X=S$_2$.

Included in the scope of the stabilizing agent of the invention are derivatives thereof. These include the corresponding carboxylic acid esters, acetals, alkyl carbonates, epoxides, urethanes, phosphates, phosphonates, phosphites, phosphonites, siloxanes, sulphonic acid esters, sulphinic acid esters and sulphenic acid esters, the preparation of which is well known to the art-skilled.

A preferred embodiment of the invention relates to a thermoplastic polycarbonate molding composition comprising a polycarbonate resin and a stabilizing agent. Containing (i) a polyether polyol and (ii) an aromatic disulfide, the agent imparts to the composition improved resistance to gamma-radiation-induced color change. Articles molded from the composition of the invention are suitable for the preparation of gamma-radiation sterilizable medical equipment.

As far as the stabilizing copolycarbonates are concerned the following bisphenols can be used in combination with the bisphenols of the formula (I) as cobisphenols for the polycondensation of the stabilizing copolycarbonates: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)-diisopropylbenzenes, and their ring-alkylated and ring-halogenated compounds.

Preferred diphenols are, for example: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Most preferred diphenols are, for example: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and other suitable diphenols are described, for example, in U.S. Pat. Nos. 3,028,365, 2999,835, 3,148,172, 2,991,273, 3,271,367 and 2,999,846, in German Offenlegungsschrifts 1,570,703, 2,063,050, 2,036,052, 2,211,956, French Patent 1,561,518, in the monograph by H. Schnell: "Chemistry and Physics of Polycarbonates", Interscience Publishers, New York, 1964, in German Patent Application P 38 32 396.6 (LeA 26,344) and in Japanese Offenlegungsschrifts 62039/1986, 62040/1986 and 105550/1986.

The stabilizing polyester carbonates can also be synthesized from bisphenolate radicals of the above-mentioned cobisphenols, in addition to the bisphenolate radicals of the formula (Ia), and from at least one aromatic dicarboxylic acid. Suitable dicarboxylic acids are for example, orthophthalic acid, terephthalic acid, isophthalic acid, tert.-butylisophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenylether dicarboxylic acid, 4,4'-diphenylsulphone-dicarboxylic acid, 2,2-bis-(4-carboxyphenyl)-propane, and trimethyl-3-phenylindane-4,5'-dicarboxylic acid.

Particularly preferred aromatic dicarboxylic acids are terephthalic acid and/or isophthalic acid.

The stabilizing oligocarbonates, polycarbonates, copolycarbonates and polyester carbonates can be produced by processes of the kind disclosed in the literature for producing aromatic oligocarbonates, aromatic polycarbonates, aromatic copolycarbonates and aromatic polyester carbonates, such as, for example, by processes in homogeneous solution, by melt transesterification processes and by the two-phase interfacial process. Preferred processes are melt transesterification processes and in particular the two-phase interfacial process.

Melt transesterification processes (the acetate process and the phenyl ester process) are described, for example, in U.S. Pat. Nos. 3,494,855, 4,286,186, 4,661,580, 4,680,371 and 4,680,372, EP-A 26, 120, 26,121, 26,684, 28,030, 39,845, 91,602, 97,970, 79,075, 146,887, 156,103, 234,913, 234,919 and 240, 301 and German Auslegeschrifts 1,495,626 and 2,232,877. The two-phase interfacial process is described for example in EP-A 68,014, 88,322, 134,898, 151,750, 182,189, 219,708 and 272,426, in German Offenlegungsschrifts 2,940,024, 3,007,934, 3,440,020 and in Polymer Reviews, Volume 10, "Condensation Polymers by Interfacial and Solution Methods", Paul W. Morgan, Interscience Publishers, New York, 1965, Chapter III, page 325-"Polyesters".

The stabilizing polyesters can also be produced by processes disclosed in the literature.

The stabilizing oligocarbonates, polycarbonates, copolycarbonates, polyester carbonates and polyesters are mixed with the aromatic polycarbonates and/or aromatic copolycarbonates and/or aromatic polyester carbonates to be stabilized in such quantities that at least 0.001% by weight to 5.0% by weight, preferably 0.005% by weight to 1.0% by weight, and particularly preferably 0.01% by weight to 0.8% by weight—based on 100% by weight of the aromatic polycarbonate and/or aromatic copolycarbonate and/or aromatic polyester carbonate to be stabilized—of the bisphenolate radical of the formula (Ia) are contained in the mixtures.

The relative solution viscosities $\eta$rel. measured in dichloromethane (0.500 g of the condensate dissolved in 100 ml of dichloromethane) at 25° C.—of the stabilizing oligocarbonates are between 1.01 and 1.17, and preferably between 1.05 and 1.14.

The relative solution viscosities—$\eta$rel., according to DIN 51,562, Part 3, measured in dichloromethane (0.500 g of the condensate dissolved in 100 ml of dichloromethane) at 25° C.—of the stabilizing polycarbonates and/or copolycarbonates and/or polyester carbonates and polyesters are between 1.17 and 1.60, and preferably between 1.18 and 1.40.

The present invention also relates to mixtures of thermoplastically formable aromatic polycondensates, such as, aromatic polycarbonates and/or aromatic copolycarbonates and/or aromatic polyester carbonates, in which at least one component is an organic compound according to formula (I) and at least one other component is an alcohol and/or a derivative of an alcohol. Such mixtures are particularly effectively stabilized against damage, for example, in the form of yellowing due to exposure to ionizing radiation, such as, for example, gamma and/or electron beam radiation. The components are mixed by conventional methods known to the skilled man for the production of aromatic polycarbonates, aromatic copolycarbonates and aromatic polyester carbonates.

The above-mentioned oligocarbonates and/or polycarbonates and/or copolycarbonates containing structural units of the formula (Ia) can also be used instead of the organic compounds according to formula (I) or in combination with the organic compounds according to formula (1).

Suitable alcohols are those containing one hydroxyl group and/or more than one hydroxyl group per molecule, i.e. mono- and polyhydric alcohols.

Suitable derivatives of mono- and polyhydric alcohols are, for example, ethers, esters, acetals, alkyl carbonates, epoxides, urethanes, phosphates, phosphonates, phosphites, phosphonites and siloxanes.

Ethers, esters, acetals and alkyl carbonates are particularly suitable.

The most suitable derivatives are ethers, and in particular those of the formula (II)

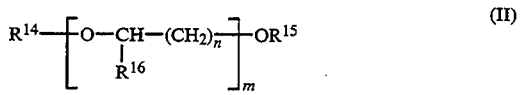

in which
$R^{14}$ and $R^{15}$ can be identical or different and can be H, branched or linear $C_1$- to $C_{30}$-alkyl, or acyl, silyl or pyranyl,
$R^{16}$ can be H or $C_1$- to $C_4$-alkyl, and
n can be an integer from 1 to 36 and
m can be an integer from 0 to 1500.

Preferred ethers are polyethers, and particularly preferred polyethers are those of the formula (IIa)

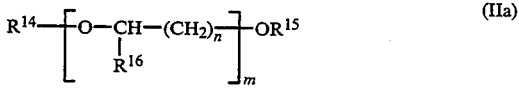

where

R$^{14}$, R$^{15}$, R$^{16}$ and n are as defined above and in which m is an integer of from 2 to 1500.

The ethers of the formula (II) can preferably have molecular weights between 106 g/mol and 100,000 g/mol, particularly preferably between 150 g/mol and 12,000 g/mol and most preferably between 500 g/mol and 10,000 g/mol.

Shaped polycarbonate articles are irradiated with ionizing radiation such as gamma or electron beam radiation, in order to sterilize objects such as dialyzers for cleaning blood, and disposable injection syringes, etc. prior to medical use. During this sterilization the polycondensate always undergoes irreversible damage, for example in the form of yellowing. In order to reduce or prevent such damage and in order to ensure that the yellowing of the material due to irradiation ceases as quickly as possible, the polycondensates have to be stabilized.

The stabilization of aromatic polycarbonates and/or aromatic copolycarbonates and/or aromatic polyester carbonates against ionizing radiation, such as gamma and/or electron beam radiation, is known from the literature: In U.S. Pat. No. 4,624,972 mixtures of polycarbonate and aromatic polycarboxylic acid esters are described in which are to some extent resistant to γ-radiation. EP 152,012 and EP 228,525 describe mixtures of polycarbonates with non-polymeric compounds which are distinguished by powerful oxidizing action and/or high reaction rates with reactants such as OH radicals or solvated electrons formed by ionizing radiation. U.S. Pat. No. 4,451,641 describes copolyesters which are stabilized to a certain extent against damage due to γ-radiation by dimeric acids or dimeric glycols.

Mixtures of aromatic polycarbonates and/or aromatic copolycarbonates and/or aromatic polyester carbonates with organic compounds according to formula (I) and/or with oligocarbonates and/or polycarbonates and/or copolycarbonates containing structural units of the formula (Ia) are, however, new.

Mixtures of aromatic polycarbonates and/or aromatic copolycarbonates and/or aromatic polyester carbonates with organic compounds according to formula (I) and/or with oligocarbonates and/or polycarbonates and/or copolycarbonates, containing structural units according to formula (Ia) and additionally mono- and/or polyhydric alcohols and/or derivatives of mono- and/or polyhydric alcohols are also new.

It has been the object of several researchers in the field to identify the means to reduce this objectionable formation of color. The patent literature is noted to include U.S. Pat. Nos. 4,804,692, 4,874,802 and 4,904,710 which disclosed gamma radiation resistant polycarbonate compositions containing polyether polyols. Also relevant is 11.08.88 - JP198940 for the disclosure that a polycarbonate composition containing an ester having mercapto group of thio glycolic acid or mercapto-propionic acid and alcohol is capable of being sterilized by exposure to radiation. A radiation sterilizable composition used for medial devices containing a semi-crystalline polymer, a hindered phenolic stabilizer, phosphite and a thioester (or thioether) has been disclosed in EP 303,894. Enhancing the color stability to sterilization radiation of polymer compositions has been disclosed in U.S. Pat. No. 4,939,185. Accordingly, compounds having defined thioether groups, including dithiane, are said to stabilize aromatic polycarbonate upon exposure to sterilizing radiation. Compounds having sulfone functional groups and thiazole functional groups have been disclosed to enhance the color stability of polycarbonate compositions in U.S. Pat. No. 4,880,855 and 4,880,856 respectively. U.S. Pat. Nos. 4,067,846 and 3,909,490 are noted to disclose flame retardant polycarbonate compositions containing metal salts of sulfonic acids of aromatic sulfides. A cyclic polycarbonate oligomer is disclosed in U.S. Pat. No. 4,751,283. The oligomer may be prepared from monomers containing aromatic disulfides.

It has surprisingly been found that compounds of the above-mentioned formula (I) and oligo- and/or polycondensates containing bisphenolate radicals, according to formula (Ia), have the required stabilizing action and unexpectedly, in particular in combination with alcohols and/or in combination with derivatives of alcohols, excellent stabilizing action against treatment with γ-rays, and that they not only considerably reduce the yellowing of the stabilized polycondensate compared with previously disclosed stabilizing systems (as can be demonstrated by determining the yellowness index of the polycondensate mixture according to the invention), —but also reduce the yellowing produced by γ-radiation to a lower yellowness index than that obtained directly after radiation after fading times of <150 hours and in certain cases even after >24 hours. Such stabilizing action and fading times cannot be obtained with the stabilizers so far known in the prior art. The stabilization, according to the invention, has the advantage that the products are considerably less damaged by ionizing radiation such as gamma and electron beam radiation, and in particular the storage times of the irradiated shaped articles are reduced by several days as a result of the considerably reduced fading times, and the articles can in some cases be used for medical applications after only very short periods of time.

Thermoplastically formable, aromatic polycarbonates and copolycarbonates which can be stabilized, according to the invention, are those based on the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)-diisopropylbenzenes, and their ring-alkylated and ring-halogenated compounds.

Preferred diphenols are, for example: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,6-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are, for example: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and other suitable diphenols are described, for example, in U.S. Pat. Nos. 3,028,365, 2,999,835, 3,148,172, 2,991,273, 3,271,367 and 2,999,846, in German Offenlegungsschrifts 1,570,703, 2,063,050, 2,036,052, 2,211,956, French Patent 1,561,518, in the monograph by H. Schnell, "Chemistry and Physics of Polycarbonates", Interscience Publishers, New York 1964, in German patent Application P 38 32 396.6 (LeA 26,344) and in Japanese Laid-Open Specifications 62039/1986, 62040/1986 and 10550/1986.

Any desired mixtures of the above-mentioned diphenols can also be used.

It is also possible to use small quantities, preferably quantities of between 0.05 and 2.0 mol % based on the moles of diphenols used, of tri- or higher than trifunctional compounds, and in particular those containing three or more than three phenolic hydroxyl groups. Examples of suitable compounds containing three or more than three phenolic hydroxyl groups are: phloroglucinol 4,6-dimethyl-2,4,6-tri-(4-hydroxyphenyl)-2-heptane, 4,6-dimethyl-2,4,6tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalic acid ester, tetra-(4-hydroxyphenyl)-methane, tetra-(4-(4-hydroxyphenyl-isopropyl)-phenoxy)-methane and 1,4-bis-(4',4''-dihydroxytriphenyl)methyl)-benzene.

Other suitable branching agents are 2,4-dihydroxybenzoic acid, trimesic acid, cyanuric chloride and 3,3-bis-(3-methyl-4-hydroxyphenyl)-2-oxo-2,3-dihydroindole.

The 0.05 to 2 mol % based on the diphenols employed, of branching agents which are optionally used, can either be initially introduced together with the diphenols and the customary chain-extending agents in the aqueous alkaline phase, or they can be added in solution in an organic solvent prior to phosgenation.

Suitable chain-terminating agents can be the chain-terminating atents, according to the invention of LeA 26,531 or other conventional chain-terminating agents. Chain-terminating agents are, for example, aromatic compounds containing a functional group such as aromatic acid halides or phenols, and in particular the customary phenols such as p-tert.-butylphenol, p-chlorophenol, 2,4,6-tribromo-phenol and phenol, and they can be used in the customary amounts which depend on the required molecular weight of the block copolymers. Particularly preferred chain terminators are phenols of the formula (III)

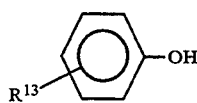

(III)

in which

R$^{13}$ represents H or a branched or linear C$_8$ - and/or C$_9$-alkyl radical.

In general, 0.5 mol % to 10.0 mol % based on the diphenols employed, are used.

The preferred polycarbonates are homopolycarbonates and copolycarbonates and mixtures thereof. The suitable polycarbonate resins have a weight average molecular weight of 10,000–200,000, preferably 20,000–80,000 and their melt flow rate, per ASTM D-1238 at 300° C., is about 1 to about 65 gm/10 min., preferably about 2–15 gm/10 min.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 gm/10 min., respectively. These are products of miles Inc. of Pittsburgh, Pa. Polycarbonate resins suitable in the practice of the invention are known and their structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The aromatic polyester carbonates stabilized according to the invention are based on at least one aromatic bisphenol, at least one aromatic dicarboxylic acid and optionally, carbonic acid. Suitable bisphenols are, for example, the aromatic dicarboxylic acids already mentioned above. Suitable aromatic dicarboxylic acids are, for example, orthophthalic acid, terephthalic acid, isophthalic acid, tert.-butylisophthalic acid, 3,3'-diphenyldicarboxylic acid, 4,4'-diphenyldicarboxylic acid, 4,4'-benzophenonedicarboxylic acid, 3,4'benzophenonedicarboxylic acid, 4,4'-diphenylether dicarboxylic acid, 4,4'diphenylsulphonedicarboxylic acid, 2,2-bis-(4-carboxyphenyl)-propane and trimethyl-3-phenyl-indane-4,5'-dicarboxylic acid.

Particularly preferred aromatic dicarboxylic acids are terephthalic acid and/or isophthalic acid.

The aromatic polycarbonates, aromatic copolycarbonates and aromatic polyester carbonates can be produced by processes of the kind disclosed in the literature for the production of polycarbonates, copolycarbonates and polyester carbonates,such as, for example, by processes in homogeneous solution, by transesterification processes and by the two-phase interfacial process. Transesterification processes and in particular the two-phase interfacial process are preferably used.

Melt transesterification processes (the acetate process and the phenyl ester process) are described, for example, in U.S. Pat. Nos. 3,494,855, 4,386,186, 4,661,580, 4,680,371 and 4,680,372, EP-A 26,120, 26,121, 26,684, 28,030, 39,845, 91,602, 97,970, 79,075, 146,887, 156,103, 234,913, 234,919 and 240,301 and German Auslegeschrifts 1,495,626 and 2,232,877. The two-phase interfacial process is described, for example, in EP-A 68,014, 88,322, 134,898, 151,750, 182,189, 219,708 and 272,426, in German Offenlegungsschrifts 2,940,024, 3,007,934, 3,440,020 and in Polymer Reviews, Volume 10, "Condensation polymers by interfacial and Solution methods", Paul W. Morgan, Interscience Publishers, New York, 1965, Chapter III, page 325—"Polyesters".

The stabilizing agent in accordance with the preferred embodiment of the present invention comprises (i) a polyether polyol and (ii) an aromatic disulfide.

(i) The polyether polyol is a compound conforming to

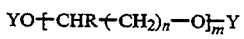

$$YO\text{\textemdash}(CHR\text{\textemdash}(CH_2)_n\text{\textemdash}O)_m\text{\textemdash}Y$$

where Y independently of one another is a hydrogen atom or a $C_{1-30}$ alkyl or acyl radicals, silyl or pyranyl radicals, and where R is a $C_{1-22}$-alkyl, cycloalkyl, aryl, alkylaryl or cycloalkyl-aryl radicals, n is an integer of 1 to 4 and m is an integer of 1 to 70; preferably Y is a hydrogen or a $C_{1-5}$ alkyl or a pyranyl radicals and R is a $C_{1-5}$ alkyl radical, n is 1 and m is about 20-50.

Compounds of this type are known and have been disclosed in the literature, see, for instance, U.S. Pat. Nos. 4,804,692, 4,874,802 and 4,904,710, the specifications of all of which are incorporated herein by reference.

(ii) The aromatic disulfide conforms to

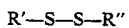

$$R'\text{\textemdash}S\text{\textemdash}S\text{\textemdash}R''$$

where R' and R" independently are aryl radicals. Diphenyl sulfide which is available in commerce is an example of a suitable compound.

In the practice of the preferred embodiment of the invention, a composition suitable for the preparation of stable articles comprise polycarbonate resin and about 0.01 to 5.0%, preferably 0.1 to 1.5% of (i) and about 0.01 to 5.0%, preferably 0.1 to 1.5% of (ii), said percent being relative to the weight of the polycarbonate resin.

The polycarbonate and/or copolycarbonate and/or polyester carbonate mixtures stabilized, according to the invention, can contain anti-ageing agents, such as, for example, thermo-stabilizers and/or UV absorbers and/or flow auxiliaries and lubricants and/or flameproofing additives and/or dyestuffs and/or other customary additives.

The invention is further illustrated but is not intended to be limited by the following examples in which all parts and percentages are by weight unless otherwise specified.

EXAMPLES

The relative solution viscosities ($\eta$rel.) of the oligo- or poly- or copolycarbonates were determined at 250° C. For this purpose 0.500 g of the respective condensate was dissolved in 100 ml of dichloromethane.

A. Synthesis of Stabilizing carbonates

Example A.1: Production of an oligocarbonate from bis-1,1'-(4-hydroxy-phenyl)-disulphide 25 g (0.1 mol) of bis-1,1'-(4-hydroxyphenyl)-disulphide are dissolved under nitrogen in sodium hydroxide solution (24 g(0.6 mol) of NaOH in 345 ml of water). A solution of 0.188 g (0.002 mol) of phenol in 186 ml of dichloromethane is added and 0.2 mol of phosgene are introduced while stirring vigorously. After adding 0.3 g of triethylamine the mixture is stirred for a further 45 minutes, the aqueous phase is separated off and the organic phase is acidified with 10% phosphoric acid and then washed with demineralized water until neutral. The organic phase is then dried over sodium sulphate, filtered off and evaporated to dryness. $\eta$rel. of the product: 1.068.

Example A.2: Production of a copolycarbonate from bis-1,1'-(4-hydroxy-phenyl)-disulphide and bisphenol-A 14,8 g (0.065 mol) of bisphenol-A and 8.8 g (0.035 mol) of bis-1,1'-(4-hydroxyphenyl)-disulphide are dissolved under nitrogen in sodium hydroxide solution (17.6 g (0.44 mol) NaOH in 253 ml of water). A solution of 0.32 g (0.003 mol) of phenol in 177 ml of dichloromethane is added and 0.16 mol of phosgene is added with vigorous stirring. After adding 0.3 g of triethylamine the mixture is stirred for a further 45 minutes, the aqueous phase is separated off and the organic phase is acidified with 10% phosphoric acid and then washed with demineralized water until neutral. The organic phase is finally dried over sodium sulphate, filtered off and evaporated to dryness. $\eta$rel. of the produce: 1.323

B. Production of the Polycarbonate Mixtures with the Stabilizers

The examples mentioned in the following table of the mixtures of polycarbonates with various stabilizers against $\gamma$-radiation were produced in a twin-screw extruder at a melt temperature of 300° C. Colored sample platelets (size: 60 mm×40 mm×4 mm) were produced from the resulting mixtures at a processing temperature of 340° C. They were sterilized with 3 mrads of $\gamma$-radiation.

| | | | | | Results: additive | | | | | | |
|---|---|---|---|---|---|---|---|---|---|---|---|
| example | oligocarbonate example A.1 % by weight | copolycarbonate example A.2 % by weight | diphenyl-disulphide % by weight | trans-stilbene % by weight | thianthrene % by weight | polypropylene glycol % by weight | polycarbonate $\eta$rel. 1.289 % by weight | YI (O) before $\gamma$-radiation with 3 mrads | YI (t) after $\gamma$-radiation with 3 mrads | $\Delta$YI | Fading time*) (=t) in hours |
| B.1 | 0.1 | | | | | 0.75 | 100 | 6.8 | 11.8 | 5.0 | 96 |
| B.2 | | 0.1 | | | | 0.75 | 100 | 5.0 | 11.3 | 6.3 | 96 |
| B.3** | | | 0.2 | | | 0.75 | 100 | 5.2 | 9.7 | 4.5 | <24 |
| B.4 | | | | 0.5 | | 0.75 | 100 | 4.8 | 13.3 | 8.5 | 120 |
| B.5 | | | | | 0.5 | 0.75 | 100 | 4.0 | 13.9 | 9.9 | 120 |
| comp. | | | | | | | 100 | 4.5 | 28.3 | 23.8 | 264 |

-continued

Results:

| example | oligocarbonate example A.1 % by weight | copolycarbonate example A.2 % by weight | diphenyl-disulphide % by weight | trans-stilbene % by weight | thianthrene % by weight | polypropylene glycol % by weight | polycarbonate ηrel. 1.289 % by weight | YI (O) before γ-radiation with 3 mrads | YI (t) after γ-radiation with 3 mrads | ΔYI | Fading time*) (=t) in hours |
|---|---|---|---|---|---|---|---|---|---|---|---|
| comp. | | | | | | 0.75 | 100 | 3.7 | 18.0 | 14.3 | 192 |

YI = yellowness index/ΔYI = YI(t) after γ-radiation − YI(O) before γ-radiation
*)fading time = time following γ-radiation at which the YI is reduced to YI(t)
**) processing temperature was 280° C. instead of 340° C.

C. Demonstration of the Preferred Embodiment

Molding compositions in accordance with the present invention have been prepared and their properties evaluated. In the preparation of the compositions, the summary of which is presented below, the resin used was a homopolycarbonate based on bisphenol-A having a melt flow rate of about 15 gm/10 min. The additives noted below were incorporated in the polycarbonate composition in the indicated amounts. The polyether polyol conformed to

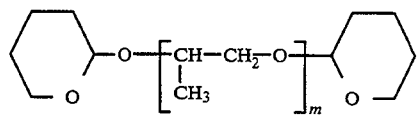

having a number average molecular weight of about 2000. The aromatic disulfide used in example 4 was diphenyl sulfide. In Examples 5 and 6 there were used respectively, a benzophenone and an acetophenone.

The polycarbonate and additives were tumble blended together and then extruded on a ZSK-30 twin screw extruder at a melt temperature of about 270° C. The extruded strands were cooled, chopped into pellets and the pellets then molded at 282° C. into chips measuring 0.100 inch in thickness (about 0.25 cm.)

The chips were subjected to gamma radiation at doses of 3 and 5 Mrad. The yellowness index (YI) of the as molded and as irradiated chips were determined in accordance with ASTM D 1925. The measurements were taken approximately 24 hours after exposure to the radiation.

The table below shows the effect of the radiation on the several compositions.

| | 1 | 2 | 3 | 4 | 5 |
|---|---|---|---|---|---|
| additive, % polyether polyol | — | 1.0 | 0.5 | 0.5 | 0.5 |
| (di)phenyl disulfide | — | — | 0.5 | — | — |
| 2-hydroxy benzophenone | — | — | — | 0.5 | — |
| 2-hydroxy acetophenone | — | — | — | — | 0.5 |
| Melt Flow Index | 15.3 | 17.8 | 18.7 | 18.1 | 17.7 |
| Yellowness index* | | | | | |
| Preradiation | 5.04/ | 2.92/ | 4.39/ | 3.76/ | 3.01/ |
| after 3 Mrad | 24.52/ | 14.1/ | 8.69/ | 15.02/ | 14.87/ |
| after 5 Mrad | 42.75 | 24.28 | 11.53 | 23.54 | 24.51 |

An additional set of compositions was prepared and the properties evaluated as summarized below. In the examples, the stabilizing effect of (di)phenyl disulfide was determined set in comparison to the effect of the stabilizing agent of the invention. The compositions were melt extruded and molded, at about 300° C., into bars measuring about 3 mm in thickness. The yellowness indices were determined before and after exposure to 3 Mrad radiation; smaller YI are indicative of better stability.

| Example | initial YI | YI after 3 Mrad | YI |
|---|---|---|---|
| A (0.05% DPS*) | 6.61 | 30.74 | 24.13 |
| B (0.1% DPS) | 6.7 | 29.2 | 22.5 |
| C (0.2% DPS) | 7.09 | 25.9 | 18.81 |
| D (0.05% DPS and 0.75% Polyether) | 5.9 | 18.35 | 12.45 |
| E (0.1% DPS and 0.75% Polyether) | 6.17 | 13.44 | 7.27 |
| F (0.2% DPS and 0.75% Polyether) | 8.1 | 12.6 | 4.5 |
| G (0.3% DPS and 0.75% Polyether) | 10.37 | 13.35 | 2.98 |

*DPS — (di)phenyl disulfide

In accordance with the findings, phenyl disulfide by itself is of little effect in stabilizing the composition. The agent of the invention, the combination of the disulfide and polyether polyol is demonstrably more effective in imparting color stability to the composition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition containing
   (i) an aromatic polycondensate selected from the group consisting of polycarbonate, copolycarbonate and polyestercarbonate wherein carbonate are based on at least one diphenol selected from the group consisting of 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-sulphone, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-)(4-hydroxyphenyl)-3,3,5-trimethyl-cyclohexane, and
   (ii) a ionization-radiation stabilizing amount of an agent selected from the group consisting of (a) a compound conforming to formula (1)

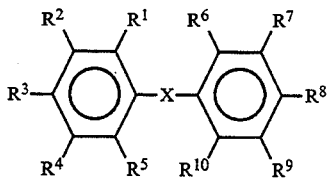

wherein $R^1$ to $R^{10}$ independently one of the others denote H, OH, SH, O-alkyl, S-alkyl, O-aryl, S-aryl, CO-alkyl, CO-aryl, COH, OCOO-alkyl, OCOO-aryl, $SO_3H$, $SO_2H$ SOH alkyl and aryl and $R^1$ and $R^6$ can be linked by a covalent bond and —X— is NH or —S—, and (b) a member selected from the group consisting of oligocarbonate, polycarbonate, copolycarbonate, polyestercarbonate and polyester which contain structural units conforming to (1a)

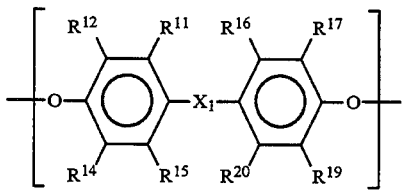

wherein $R^{11}$, $R^{12}$, $R^{14}$, $R^{15}$, $R^{16}$, $R^{17}$, $R^{19}$ and $R^{20}$ independently denote H-alkyl, S-alkyl, O-aryl, S-aryl, COO-alkyl, COO-aryl, CO-alkyl, CO-aryl, OCOO-alkyl, OCOO-aryl, $SO_3$-alkyl, $SO_3$-aryl, $SO_2$-alkyl, $SO_2$-aryl, alkyl and aryl and —$X_1$— is —$S_2$— and wherein the relative solution viscosity (measured as 0.500 g of said member in 100 ml of dichloromethane at 25° C.) of said oligocarbonate is about 1.01 to 1.17, and wherein the relative solution viscosity of said polycarbonate, copolycarbonate, polyestercarbonate and polyester is about 1.17 to 1.60.

2. The composition of claim 1 wherein agent is (a).

3. The composition of claim 2 wherein said amount is 0.005 to 5% relative to the weight of the composition.

4. The composition of claim 1 wherein at least one of said $R^1$ to $R^{10}$ denotes an OH group.

5. The composition of claim 1 wherein said agent is a polyhydric alcohol.

6. The composition of claim 1 further containing an ether.

7. The composition of claim 6 wherein ether corresponds to

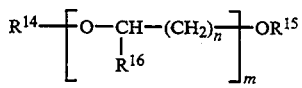

in which
$R^{14}$ and $R^{15}$ can be identical or different and can be H, branched or linear $C_1$ to $C_{30}$-alkyl, or acyl, silyl or pyranyl,
$R^{16}$ can be H or $C_1$ to $C_4$ alkyl,
n can be an integer from 1 to 36 and
m can be an integer from 0 to 1500.

8. The composition of claim 7 wherein m is 2 to 1500.

9. The composition of claim 7 wherein said ether has a molecular weight of about 500 to 10,000 g/mol.

10. The composition of claim 1 further containing at least one member selected from the group consisting of a thermal stabilizer, UV absorber, plasticizer, lubricant, flame retardant, dye, reinforcing agent and filler.

* * * * *